United States Patent
Taylor et al.

(10) Patent No.: US 10,428,713 B2
(45) Date of Patent: Oct. 1, 2019

(54) SYSTEMS AND METHODS FOR EXHAUST HEAT RECOVERY AND HEAT STORAGE

(71) Applicant: DENSO International America, Inc., Southfield, MI (US)

(72) Inventors: Dwayne Taylor, Livonia, MI (US); Alec Bergweiler, Leverett, MA (US); Zhiwei Shan, Farmington Hills, MI (US); Mark Kastner, Livonia, MI (US)

(73) Assignee: DENSO International America, Inc., Southfield, MI (US)

( * ) Notice: Subject to any disclaimer, the term of this patent is extended or adjusted under 35 U.S.C. 154(b) by 25 days.

(21) Appl. No.: 15/698,021

(22) Filed: Sep. 7, 2017

(65) Prior Publication Data

US 2019/0072018 A1 Mar. 7, 2019

(51) Int. Cl.
| | |
|---|---|
| *F01P 11/14* | (2006.01) |
| *F01N 5/02* | (2006.01) |
| *F02N 19/02* | (2010.01) |
| *F01P 7/16* | (2006.01) |
| *F02D 41/02* | (2006.01) |
| *F02D 13/02* | (2006.01) |

(52) U.S. Cl.
CPC ............... *F01N 5/02* (2013.01); *F01P 7/16* (2013.01); *F02N 19/02* (2013.01); *F01N 2240/02* (2013.01); *F01P 2060/08* (2013.01); *F01P 2060/16* (2013.01); *F02D 41/0255* (2013.01); *F02D 2013/0292* (2013.01); *F02G 2260/00* (2013.01)

(58) Field of Classification Search
CPC ........ F01N 5/02; F01N 2240/02; Y02T 10/16; F02N 19/02; F02D 41/0255; F02D 2013/0292; F02G 2260/00
USPC .......... 123/676; 60/284, 295, 298, 300, 303, 60/320, 321
See application file for complete search history.

(56) References Cited

U.S. PATENT DOCUMENTS

| | | | |
|---|---|---|---|
| 3,665,949 A | 5/1972 | Rivard | |
| 3,686,893 A | 8/1972 | Edwards | |
| 3,804,596 A | 4/1974 | Fischer | |
| 3,888,084 A | 6/1975 | Hawkins | |
| 4,137,965 A | 2/1979 | Fallon, Jr. et al. | |
| 4,161,211 A | 7/1979 | Duffy et al. | |
| 4,175,397 A | 11/1979 | Edwards et al. | |
| 4,202,660 A | 5/1980 | Pei | |
| 4,220,197 A | 9/1980 | Schaefer et al. | |

(Continued)

FOREIGN PATENT DOCUMENTS

| | | |
|---|---|---|
| CA | 1192949 A | 9/1985 |
| CA | 2209253 A1 | 1/1999 |

(Continued)

*Primary Examiner* — Hai H Huynh
*Assistant Examiner* — Gonzalo Laguarda
(74) *Attorney, Agent, or Firm* — Harness, Dickey & Pierce, P.L.C.

(57) ABSTRACT

An exhaust heat recovery system. The system includes a heat exchanger configured to transfer heat from engine exhaust to a heat transfer fluid. A reservoir is in fluid communication with the heat exchanger. A pump is configured to pump the heat transfer fluid out of the heat exchanger and into the reservoir, and in doing so displace air out of the reservoir to the heat exchanger, when temperature of the heat transfer fluid exceeds a predetermined temperature.

13 Claims, 4 Drawing Sheets

(56) References Cited

U.S. PATENT DOCUMENTS

| | | | |
|---|---|---|---|
| 4,248,297 A | 2/1981 | Pei | |
| 4,284,421 A | 8/1981 | Howard | |
| 4,285,206 A | 8/1981 | Koser | |
| 4,301,649 A | 11/1981 | Walker | |
| 4,342,200 A | 8/1982 | Lowi, Jr. | |
| 4,373,573 A | 2/1983 | Madwed | |
| 4,391,235 A * | 7/1983 | Majkrzak | F02N 19/10 123/142.5 R |
| 4,393,656 A | 7/1983 | Anderson et al. | |
| 4,409,932 A | 10/1983 | Gill | |
| 4,414,926 A * | 11/1983 | Webber | F01P 11/18 123/41.15 |
| 4,422,370 A | 12/1983 | Gustavson | |
| 4,448,028 A | 5/1984 | Chao et al. | |
| 4,494,598 A | 1/1985 | DeHaan et al. | |
| 4,532,983 A | 8/1985 | Bradshaw et al. | |
| 4,629,479 A | 12/1986 | Cantoni | |
| 4,688,537 A | 8/1987 | Calkins et al. | |
| 4,694,654 A | 9/1987 | Kawamura | |
| 4,777,796 A | 10/1988 | McEachern, Jr. | |
| 4,805,409 A | 2/1989 | Kobayashi | |
| 4,850,537 A | 7/1989 | Gourdine | |
| 5,044,423 A | 9/1991 | Schatz | |
| 5,106,590 A | 4/1992 | Hopper et al. | |
| 5,231,849 A | 8/1993 | Rosenblatt | |
| 5,291,738 A | 3/1994 | Waldrop | |
| 5,327,739 A | 7/1994 | Ingersoll et al. | |
| 5,351,487 A | 10/1994 | Abdelmalek | |
| 5,366,151 A | 11/1994 | King et al. | |
| 5,398,747 A | 3/1995 | Miaoulis | |
| 5,400,596 A | 3/1995 | Shlien | |
| 5,450,894 A | 9/1995 | Inoue et al. | |
| 5,482,402 A | 1/1996 | Nelson | |
| 5,503,222 A | 4/1996 | Dunne | |
| 5,507,153 A | 4/1996 | Seto et al. | |
| 5,516,571 A | 5/1996 | Kawamoto | |
| 5,667,560 A | 9/1997 | Dunne | |
| 5,708,306 A | 1/1998 | Lin | |
| 5,730,089 A | 3/1998 | Morikawa et al. | |
| 5,746,259 A | 5/1998 | Noble, III | |
| 5,799,632 A * | 9/1998 | Bennett | F01P 11/20 123/142.5 R |
| 5,894,834 A | 4/1999 | Kim | |
| 5,934,360 A | 8/1999 | Ban et al. | |
| 5,944,090 A | 8/1999 | Teal | |
| 5,969,189 A | 10/1999 | Holtzapple et al. | |
| 5,994,681 A | 11/1999 | Lloyd | |
| 6,079,218 A | 6/2000 | Ueda | |
| 6,151,891 A * | 11/2000 | Bennett | F01N 3/043 60/298 |
| 6,286,316 B1 | 9/2001 | Waldrop et al. | |
| 6,340,013 B1 | 1/2002 | Britton | |
| 6,415,607 B1 | 7/2002 | Gray, Jr. | |
| 6,435,420 B1 | 8/2002 | Kasai et al. | |
| 6,481,222 B1 | 11/2002 | Denniston | |
| 6,627,330 B1 | 9/2003 | Shimizu et al. | |
| 6,630,113 B1 | 10/2003 | Surma | |
| 6,655,137 B1 | 12/2003 | Sardari | |
| 6,675,437 B1 | 1/2004 | York | |
| 6,675,882 B1 | 1/2004 | Luberda | |
| 6,680,619 B1 | 1/2004 | Horn | |
| 6,698,389 B2 | 3/2004 | Andrews et al. | |
| 6,725,662 B2 | 4/2004 | Baba et al. | |
| 6,746,515 B2 | 6/2004 | Wegeng et al. | |
| 6,832,475 B2 | 12/2004 | Tanaka et al. | |
| 6,843,312 B2 | 1/2005 | Burk et al. | |
| 6,845,618 B2 | 1/2005 | Niikura et al. | |
| 6,865,825 B2 | 3/2005 | Bailey, Sr. et al. | |
| 6,866,092 B1 | 3/2005 | Molivadas | |
| 6,907,734 B2 | 6/2005 | Shinohara et al. | |
| 6,948,319 B2 | 9/2005 | Hayakawa et al. | |
| 6,983,105 B1 | 1/2006 | Greene | |
| 7,021,059 B2 | 4/2006 | Shinohara et al. | |
| 7,043,920 B2 | 5/2006 | Viteri et al. | |
| 7,055,315 B2 | 6/2006 | Shinohara et al. | |
| 7,062,915 B2 | 6/2006 | Clawson | |
| 7,069,977 B2 | 7/2006 | Shinohara et al. | |
| 7,073,348 B2 | 7/2006 | Clodic et al. | |
| 7,171,991 B2 | 2/2007 | Aoyama et al. | |
| 7,181,918 B2 | 2/2007 | Reinders | |
| 7,220,365 B2 | 5/2007 | Qu et al. | |
| 7,237,602 B2 | 7/2007 | Arai et al. | |
| 7,281,380 B2 | 10/2007 | Shinohara et al. | |
| 7,281,703 B2 | 10/2007 | Inaba et al. | |
| 7,430,865 B2 | 10/2008 | Filippone | |
| 7,430,875 B2 | 10/2008 | Sasaki et al. | |
| 7,629,530 B2 | 12/2009 | Inaoka | |
| 7,654,232 B2 | 2/2010 | Ishimaru et al. | |
| 7,654,312 B2 * | 2/2010 | Baeuerle | B60H 1/025 165/202 |
| 8,069,906 B2 | 12/2011 | Mukoubara et al. | |
| 8,151,753 B2 | 4/2012 | Kamiyama et al. | |
| 8,223,495 B1 | 7/2012 | Carlson et al. | |
| 8,297,049 B2 | 10/2012 | Ohtani | |
| 8,333,068 B2 * | 12/2012 | Muramatsu | F01N 3/0205 60/320 |
| 8,371,512 B2 | 2/2013 | Douarre | |
| 8,396,645 B2 | 3/2013 | Bakharev | |
| 8,397,504 B2 | 3/2013 | Guzman et al. | |
| 8,491,678 B1 | 7/2013 | Bossard | |
| 8,574,507 B2 | 11/2013 | Obuchi et al. | |
| RE45,644 E | 8/2015 | Cheiky | |
| 9,140,168 B2 | 9/2015 | Reynolds | |
| 9,140,500 B2 | 9/2015 | Goto et al. | |
| 9,145,812 B2 | 9/2015 | An et al. | |
| 9,181,866 B2 | 11/2015 | Jensen et al. | |
| 9,205,347 B2 | 12/2015 | Batty et al. | |
| 9,228,472 B2 | 1/2016 | Greiner et al. | |
| 9,234,482 B2 | 1/2016 | Bromberg et al. | |
| 9,243,821 B2 | 1/2016 | Hasegawa | |
| 9,249,475 B2 | 2/2016 | Kawano et al. | |
| 9,297,292 B2 | 3/2016 | Takeuchi | |
| 9,297,564 B2 | 3/2016 | Wagaman et al. | |
| 9,328,657 B2 | 5/2016 | Ulrey et al. | |
| 9,382,799 B2 | 7/2016 | Stahlkopf et al. | |
| 9,395,123 B1 | 7/2016 | Leimkuehler et al. | |
| 2002/0081253 A1 | 6/2002 | Abe | |
| 2002/0134542 A1 | 9/2002 | Unsworth | |
| 2002/0157810 A1 | 10/2002 | Damson et al. | |
| 2004/0031388 A1 | 2/2004 | Hsu | |
| 2004/0164467 A1 | 8/2004 | Aoyama et al. | |
| 2005/0019139 A1 | 1/2005 | Aoyama et al. | |
| 2005/0081681 A1 | 4/2005 | Yamaki et al. | |
| 2005/0103487 A1 | 5/2005 | Aflekt et al. | |
| 2005/0204762 A1 | 9/2005 | Sasaki et al. | |
| 2005/0217714 A1 | 10/2005 | Nishijima et al. | |
| 2005/0262858 A1 | 12/2005 | Inaba et al. | |
| 2005/0274493 A1 | 12/2005 | Golben | |
| 2006/0070560 A1 | 4/2006 | Nakazawa | |
| 2006/0162829 A1 | 7/2006 | Nakazawa et al. | |
| 2006/0231235 A1 | 10/2006 | Yamanaka et al. | |
| 2007/0137594 A1 | 6/2007 | Boudard et al. | |
| 2007/0137851 A1 | 6/2007 | Hamada et al. | |
| 2007/0193617 A1 | 8/2007 | Taguchi | |
| 2007/0284087 A1 | 12/2007 | Kohara et al. | |
| 2008/0011458 A1 | 1/2008 | Miyagawa et al. | |
| 2008/0034729 A1 | 2/2008 | Tafas | |
| 2008/0035195 A1 | 2/2008 | Bell | |
| 2008/0110421 A1 | 5/2008 | Flessner et al. | |
| 2008/0115487 A1 | 5/2008 | Harada et al. | |
| 2008/0115923 A1 | 5/2008 | Yamanaka et al. | |
| 2008/0257535 A1 | 10/2008 | Cournane | |
| 2009/0183697 A1 | 7/2009 | Inui | |
| 2009/0205342 A1 | 8/2009 | Jang et al. | |
| 2009/0229796 A1 | 9/2009 | Williams et al. | |
| 2009/0241863 A1 | 10/2009 | Kimura et al. | |
| 2009/0267349 A1 | 10/2009 | Spitzauer et al. | |
| 2009/0301601 A1 | 12/2009 | Enerson et al. | |
| 2010/0006073 A1 | 1/2010 | Jatkar | |
| 2010/0006273 A1 | 1/2010 | Du et al. | |
| 2010/0017638 A1 | 1/2010 | Ghose | |
| 2010/0043413 A1 | 2/2010 | Orihashi et al. | |
| 2010/0043427 A1 | 2/2010 | Sawada et al. | |
| 2010/0146949 A1 | 6/2010 | Stobart et al. | |

(56) References Cited

U.S. PATENT DOCUMENTS

| | | | |
|---|---|---|---|
| 2010/0186422 | A1 | 7/2010 | Yang et al. |
| 2010/0193168 | A1 | 8/2010 | Johnson, Jr. |
| 2010/0197441 | A1 | 8/2010 | Pursifull |
| 2010/0218930 | A1 | 9/2010 | Proeschel |
| 2010/0236763 | A1 | 9/2010 | Torok |
| 2010/0270011 | A1 | 10/2010 | Takahashi et al. |
| 2010/0314089 | A1 | 12/2010 | Evans-Beauchamp |
| 2011/0036320 | A1 | 2/2011 | Peret |
| 2011/0088378 | A1 | 4/2011 | Prior et al. |
| 2011/0107761 | A1 | 5/2011 | Rowland |
| 2011/0126783 | A1 | 6/2011 | Hwang et al. |
| 2011/0180235 | A1 | 7/2011 | Garimella et al. |
| 2011/0185712 | A1 | 8/2011 | Burns et al. |
| 2011/0239646 | A1 | 10/2011 | Bennet et al. |
| 2011/0284200 | A1 | 11/2011 | Gooden et al. |
| 2012/0012293 | A1 | 1/2012 | Doty |
| 2012/0048504 | A1 | 3/2012 | Park et al. |
| 2012/0152487 | A1 | 6/2012 | Styles et al. |
| 2012/0216762 | A1 | 8/2012 | Ernst et al. |
| 2012/0247732 | A1 | 10/2012 | Suzuki et al. |
| 2012/0260640 | A1 | 10/2012 | Martin et al. |
| 2012/0273158 | A1 | 11/2012 | Cui et al. |
| 2012/0312497 | A1 | 12/2012 | Parida et al. |
| 2013/0025842 | A1 | 1/2013 | Carlson et al. |
| 2013/0037235 | A1 | 2/2013 | Sakabe et al. |
| 2013/0037254 | A1 | 2/2013 | Carlson et al. |
| 2013/0174544 | A1 | 7/2013 | Valetutti |
| 2013/0213632 | A1 | 8/2013 | Morita et al. |
| 2013/0240284 | A1 | 9/2013 | Ajisaka |
| 2013/0248159 | A1 | 9/2013 | Yoshida et al. |
| 2013/0248160 | A1 | 9/2013 | Eplee |
| 2013/0299599 | A1 | 11/2013 | Mihama et al. |
| 2013/0319027 | A1 | 12/2013 | Tsubouchi |
| 2014/0020877 | A1 | 1/2014 | Suzuki et al. |
| 2014/0026577 | A1 | 1/2014 | Reinke et al. |
| 2014/0060044 | A1 | 3/2014 | Gonze et al. |
| 2014/0060086 | A1 | 3/2014 | Ranalli et al. |
| 2014/0090821 | A1 | 4/2014 | Suzuki et al. |
| 2014/0102683 | A1 | 4/2014 | Kawaguchi et al. |
| 2014/0103129 | A1 | 4/2014 | Ray et al. |
| 2014/0109976 | A1 | 4/2014 | Mathias et al. |
| 2014/0123626 | A1 | 5/2014 | Brown et al. |
| 2014/0208752 | A1 | 7/2014 | Palanisamy |
| 2014/0290296 | A1 | 10/2014 | Katoh |
| 2015/0053366 | A1 | 2/2015 | Melsheimer |
| 2015/0128590 | A1 | 5/2015 | Engineer et al. |
| 2015/0143806 | A1 | 5/2015 | Friesth |
| 2015/0176464 | A1 | 6/2015 | Hotta et al. |
| 2015/0176913 | A1 | 6/2015 | Buckrell et al. |
| 2015/0226154 | A1 | 8/2015 | Ueda et al. |
| 2015/0273974 | A1 | 10/2015 | Levin et al. |
| 2015/0323265 | A1 | 11/2015 | Hodsdon et al. |
| 2015/0360539 | A1 | 12/2015 | Park et al. |
| 2016/0069624 | A1 | 3/2016 | Rollins et al. |
| 2016/0084197 | A1 | 3/2016 | Davis |
| 2016/0116224 | A1 | 4/2016 | Shedd et al. |
| 2016/0138427 | A1 | 5/2016 | Yin et al. |
| 2016/0169080 | A1 | 6/2016 | Lee et al. |
| 2016/0169081 | A1 | 6/2016 | Hosokawa |
| 2016/0187009 | A1 | 6/2016 | Vandermeulen et al. |
| 2016/0215680 | A1 | 7/2016 | Quix |

FOREIGN PATENT DOCUMENTS

| | | |
|---|---|---|
| CA | 2251095 A1 | 5/2003 |
| CA | 2522952 A1 | 4/2006 |
| CA | 2880357 A1 | 8/2015 |
| CN | 2302914 Y | 1/1999 |
| CN | 2392684 Y | 8/2000 |
| CN | 101408115 B | 4/2003 |
| CN | 101368525 A | 2/2009 |
| CN | 201203373 Y | 3/2009 |
| CN | 101408115 A | 4/2009 |
| CN | 101451484 A | 6/2009 |
| CN | 201696124 U | 1/2011 |
| CN | 103105085 A | 5/2013 |
| CN | 202912813 U | 5/2013 |
| CN | 203240934 U | 10/2013 |
| CN | 103470352 A | 12/2013 |
| CN | 203515746 U | 4/2014 |
| CN | 203515747 U | 4/2014 |
| CN | 103982328 A | 8/2014 |
| CN | 203783758 U | 8/2014 |
| CN | 204172884 U | 2/2015 |
| CN | 103075275 B | 4/2015 |
| CN | 204646383 U | 9/2015 |
| CN | 105317584 A | 2/2016 |
| DE | 102013107251 A1 | 1/2015 |
| EP | 0133428 A1 | 2/1985 |
| EP | 0016225 B2 | 10/1987 |
| EP | 0294146 B1 | 5/1992 |
| EP | 0992377 A1 | 4/2000 |
| EP | 0767081 B1 | 12/2001 |
| EP | 1198675 A1 | 4/2002 |
| EP | 0871537 B1 | 11/2003 |
| EP | 1610084 A1 | 12/2005 |
| EP | 1774230 A2 | 4/2007 |
| EP | 1970971 A1 | 9/2008 |
| EP | 2018285 A1 | 1/2009 |
| EP | 2055515 A1 | 5/2009 |
| EP | 2263056 A2 | 12/2010 |
| EP | 2228615 A3 | 6/2011 |
| EP | 1970972 B1 | 9/2011 |
| EP | 2318676 B1 | 11/2011 |
| EP | 2444509 A1 | 4/2012 |
| EP | 2480851 A1 | 8/2012 |
| EP | 2500530 A1 | 9/2012 |
| EP | 2596225 A1 | 5/2013 |
| EP | 2503134 A3 | 9/2013 |
| EP | 2735597 A1 | 5/2014 |
| EP | 2806131 A1 | 11/2014 |
| EP | 2811142 B1 | 7/2015 |
| EP | 2282357 B1 | 12/2015 |
| EP | 2952705 A1 | 12/2015 |
| FR | 2459886 A1 | 1/1981 |
| FR | 2489418 A1 | 3/1982 |
| FR | 2718491 B1 | 6/1996 |
| FR | 2774462 B1 | 4/2000 |
| FR | 2810076 B1 | 5/2005 |
| FR | 2921689 A1 | 4/2009 |
| FR | 2997446 A1 | 12/2014 |
| GB | 797783 A | 7/1958 |
| GB | 1345970 A | 2/1974 |
| GB | 1426790 A | 3/1976 |
| GB | 2432205 A | 5/2007 |
| JP | S58158949 U | 10/1983 |
| JP | 2000297699 A | 10/2000 |
| JP | 2004036499 A | 2/2004 |
| JP | 2016511355 A | 4/2016 |
| KR | 19980060686 A | 10/1998 |
| KR | 20010090620 A | 10/2001 |
| KR | 20020037964 A | 5/2002 |
| KR | 20080012435 A | 2/2008 |
| KR | 100808789 B1 | 3/2008 |
| KR | 101129197 B1 | 3/2012 |
| KR | 20130058996 A | 6/2013 |
| WO | WO-8402857 A1 | 8/1984 |
| WO | WO-1994002257 A3 | 3/1994 |
| WO | WO-1999022120 A1 | 5/1999 |
| WO | WO-0106134 A1 | 1/2001 |
| WO | WO-2001014813 A1 | 3/2001 |
| WO | WO-2002097354 A1 | 12/2002 |
| WO | WO-2005103453 A1 | 11/2005 |
| WO | WO-2005121660 A2 | 12/2005 |
| WO | WO-2006012087 A3 | 8/2006 |
| WO | WO-2007132326 A1 | 11/2007 |
| WO | WO-2009050534 A1 | 4/2009 |
| WO | WO-2009076637 A2 | 6/2009 |
| WO | WO-2009112946 A2 | 9/2009 |
| WO | WO-2009156786 A1 | 12/2009 |
| WO | WO-2010031162 A9 | 11/2010 |
| WO | WO-2011037596 A1 | 3/2011 |
| WO | WO-2011073470 A1 | 6/2011 |
| WO | WO-2012010960 A1 | 1/2012 |

(56) References Cited

FOREIGN PATENT DOCUMENTS

| | | |
|---|---|---|
| WO | WO-2013116861 A1 | 8/2013 |
| WO | WO-2013167823 A1 | 11/2013 |
| WO | WO-2011066964 A3 | 2/2014 |
| WO | WO-2014052310 A1 | 4/2014 |
| WO | WO-2014136024 A1 | 9/2014 |
| WO | WO-2014165147 A1 | 10/2014 |
| WO | WO-2015034448 A1 | 3/2015 |
| WO | WO-2010109145 A3 | 8/2015 |
| WO | WO-2015168018 A1 | 11/2015 |
| WO | WO-2016000016 A1 | 1/2016 |
| WO | WO-2016010266 A1 | 1/2016 |
| WO | WO-2016038384 A1 | 3/2016 |
| WO | WO-2016065048 A1 | 4/2016 |

* cited by examiner

SYSTEMS AND METHODS FOR EXHAUST HEAT RECOVERY AND HEAT STORAGE

FIELD

The present disclosure relates to systems and methods for exhaust heat recovery and heat storage.

BACKGROUND

This section provides background information related to the present disclosure, which is not necessarily prior art.

Due to the increasingly stringent fuel economy and $CO_2$ emissions regulations, automakers are developing numerous technologies to reduce fuel consumption. For example, exhaust heat recovery systems are used to facilitate engine warmup, which improves fuel economy. Such systems typically include a heat exchanger, which transfers heat from exhaust gas to engine heat transfer fluid during a cold engine start. This shortens the time needed for heat transfer fluid to reach its optimal operating temperature and, by extension, the time required for the engine to warm up and reach its optimal operating temperature.

With exhaust heat recovery systems it is not desirable to have a heat exchanger operational at all times, because the engine may overheat and/or the engine heat transfer fluid may be damaged by high exhaust temperatures. Existing exhaust heat recovery systems typically address these issues by using a diverter valve that opens when the engine is sufficiently warm to direct exhaust to bypass the heat exchanger, which prevents the heat transfer fluid from overheating. This approach places the heat exchanger in parallel with the normal exhaust system routing, which undesirably adds to the packaging space (which can be a bigger problem for vehicles with larger exhaust system components, such as pickup trucks), adds cost due to the need for exhaust diverter valves (which are typically stainless steel in order to provide resistance to temperature and corrosive exhaust gasses), and changes the exhaust back pressure characteristics, which typically complicates the engine calibration process.

The present teachings advantageously provide for an exhaust heat recovery system that does not intrude into the exhaust system itself (or minimizes such intrusion if exhaust side heat transfer enhancements such as multiple flow paths and/or exhaust side fins are included), or require dual exhaust system pathways (one for when exhaust heat recovery is operational, and one for when it is not operational) as found in conventional systems. In contrast to current systems, the present teachings advantageously remove heat transfer fluid from the exhaust heat recovery heat exchanger when heat recovery is not needed, and return the heat transfer fluid into the heat exchanger when exhaust heat recovery is desired, which prevents overheating of the heat transfer fluid. Furthermore, in one embodiment the present teachings advantageously combine exhaust heat recovery and heat storage into a single system, as explained in detail herein. The present teachings are particularly advantageous because exhaust heat recovery and heat storage are the two most effective ways to improve fuel economy by thermal management. One skilled in the art will appreciate that the present teachings provide for numerous additional advantages in addition to those specifically described, as well as numerous unexpected results.

SUMMARY

This section provides a general summary of the disclosure, and is not a comprehensive disclosure of its full scope or all of its features.

The present teachings provide for an exhaust heat recovery system. The system includes a heat exchanger configured to transfer heat from engine exhaust to a heat transfer fluid. A reservoir is in fluid communication with the heat exchanger. A pump is configured to pump the heat transfer fluid out of the heat exchanger and into the reservoir, and in doing so displace air out of the reservoir to the hear exchanger, when temperature of the heat transfer fluid exceeds a predetermined temperature.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

DETAILED DESCRIPTION

Example embodiments will now be described more fully with reference to the accompanying drawings.

Figures 1, 2:
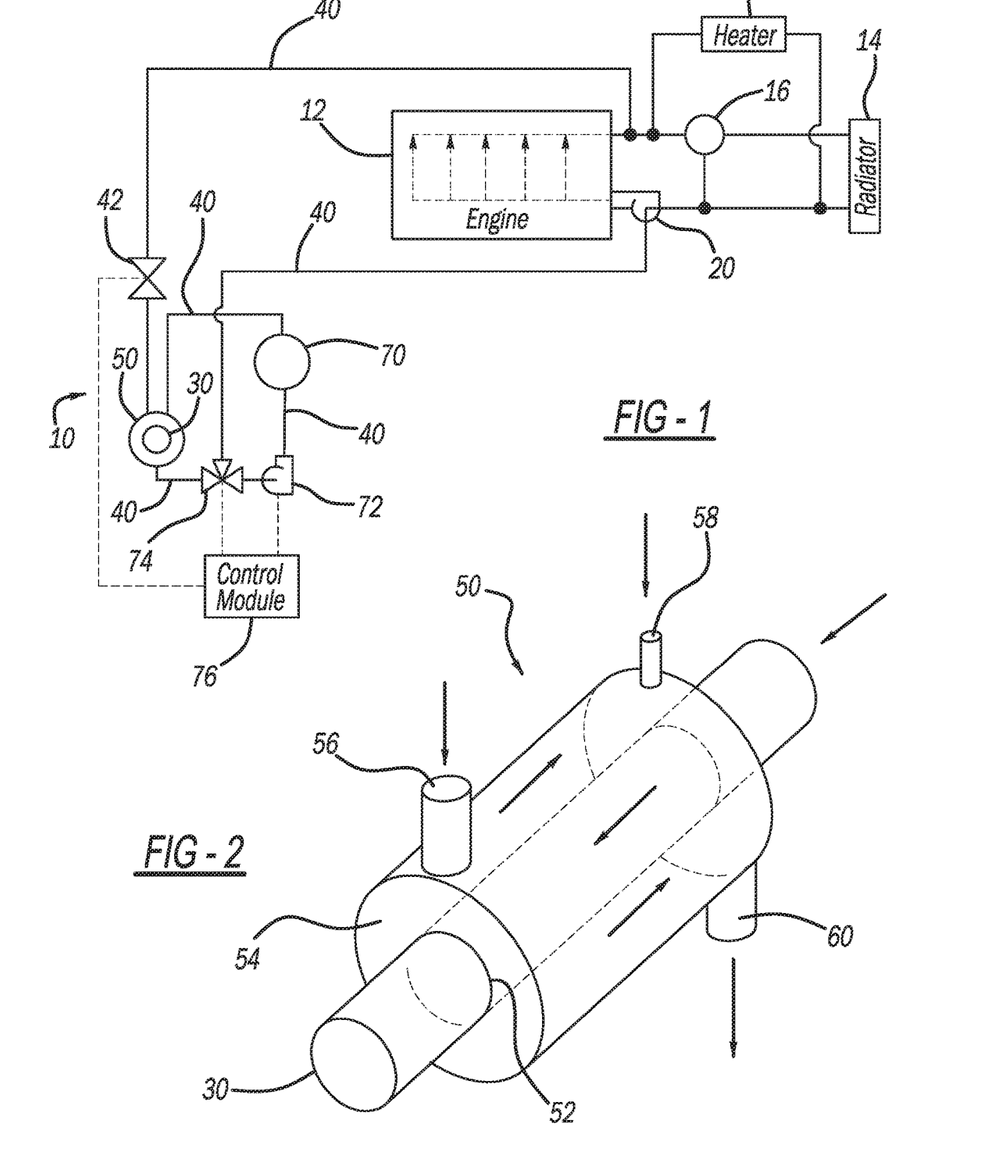
FIG. 1 illustrates an exemplary exhaust heat recovery and heat storage system according to the present teachings connected to an exemplary engine.
FIG. 2 illustrates an exemplary heat exchanger of the exhaust heat recovery and heat storage system of FIG. 1.

With initial reference to FIG. 1, an exhaust heat recovery and heat storage system in accordance with the present teachings is illustrated at reference numeral 10. As explained herein, the system 10 generally receives heat transfer fluid from an engine 12, transfers heat to the heat transfer fluid from exhaust generated by the engine 12, and directs the warmed heat transfer fluid back to the engine 12 in order to facilitate warmup of the engine 12. The heat transfer fluid may be any suitable heat transfer fluid for the engine 12. For example, the heat transfer fluid can be a 50/50 mixture of ethylene glycol and water, or any other suitable heat transfer fluid. The engine 12 can be any suitable type of engine, such as any suitable vehicle engine. Exemplary vehicle engines include engines for passenger vehicles, mass transit vehicles, military vehicles, construction vehicles, aircraft, watercraft, etc. The engine 12 can also be any suitable non-vehicular engine, such as a generator engine, construction equipment engine, etc.

In the example illustrated, a radiator 14 is in fluid communication with the engine 12. When heat transfer fluid of the engine 12 exceeds a predetermined temperature, such as measured by thermostat 16, the heat transfer fluid can be directed to the radiator 14, which releases heat from the heat transfer fluid into the atmosphere. Warmed heat transfer fluid can also be circulated through a heater 18, which can be a passenger cabin heater for heating a vehicle passenger cabin. Any suitable pump 20 may be included to pump the heat transfer fluid through the engine 12.

The system 10 further includes any suitable heat exchanger 50 for transferring heat to the heat transfer fluid from exhaust generated by the engine 12. In the example illustrated, the heat exchanger 50 defines a through bore 52 through which an exhaust pipe 30 of the engine 12 extends, as illustrated in FIG. 2 for example. An outer chamber 54 of the heat exchanger 50 surrounds the exhaust pipe 30 such that heat transfer fluid within the outer chamber 54 is warmed by exhaust flowing through the exhaust pipe 30.

The heat exchanger 50 includes an engine inlet 56, a reservoir inlet 58, and a passageway 60, each of which are connected to any suitable conduits 40 for transporting heat transfer fluid. The conduits 40 can be any suitable conduit, such as any suitable pipe or hose. Along the conduit 40 extending from the engine 12 to the heat exchanger 50 is a valve 42. The valve 42 can be any suitable valve or device for controlling flow of heat transfer fluid from the engine 12 to the heat exchanger 50.

The engine inlet 56 receives heat transfer fluid from the engine 12. Thus the engine inlet 56 is in fluid communication with the engine 12 to receive heat transfer fluid that has been circulated through the engine 12. The heat transfer fluid flows through the inlet 56, through the chamber 54, and out of the heat exchanger 50 through the passageway 60. The reservoir inlet 58 is connected to a reservoir 70 with any suitable conduit 40 so as to allow air (or in some applications nitrogen, or any other inert gas) to flow between the reservoir 70 and the chamber 54 of the heat exchanger 50 as described herein.

The reservoir 70 is for storing the heat transfer fluid and/or air or any other suitable gas, such as nitrogen. The reservoir 70 can be mounted at a higher elevation than the heat exchanger 50 to allow heat transfer fluid within the reservoir 70 to flow to the heat exchanger 50 by gravity. Arranged along conduits 40 connecting the reservoir 70 to the heat exchanger 50 is a pump 72. The pump 72 can be any suitable pump, such as an electric pump. Between the pump 72 and the heat exchanger 50 is a valve 74. The valve 74 can be any suitable valve or other device for selectively directing heat transfer fluid between the heat exchanger 50 and the reservoir 70, from the heat exchanger 50 to the engine 12, or from the reservoir 70 to the engine 12, as explained herein.

The valve 42, the pump 72, and the valve 74 can be controlled by any suitable control module 76 to control the flow of heat transfer fluid, as explained in detail herein. Any suitable control module 76 can be used. In this application, including the definitions below, the term "control module" may be replaced with the term "circuit." The term "module" may refer to, be part of, or include processor hardware (shared, dedicated, or group) that executes code and memory hardware (shared, dedicated, or group) that stores code executed by the processor hardware. The code is configured to provide the features of the control module 76 described herein. The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

Figures 3, 4, 5:
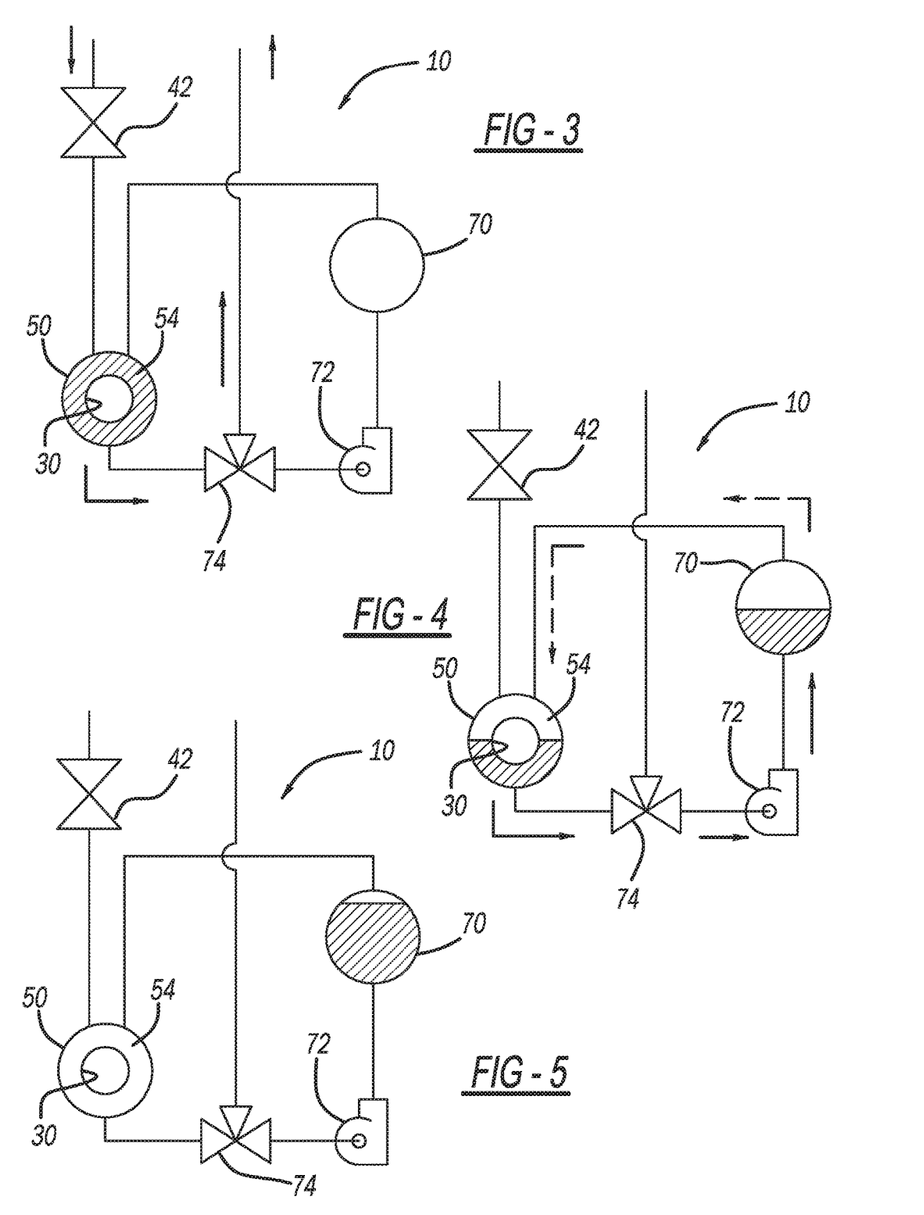
FIG. 3 illustrates the exhaust heat recovery and heat storage system of FIG. 1 in a heat recovery mode.
FIG. 4 illustrates the exhaust heat recovery and heat storage system of FIG. 1 in a pump out mode.
FIG. 5 illustrates the exhaust heat recovery and heat storage system of FIG. 1 in a standby mode.

FIG. 3 illustrates the system 10 in an exemplary heat recovery mode. In the heat recovery mode of FIG. 3, the control module 76 opens the valve 42 to allow heat transfer fluid to flow from the engine 12 into the chamber 54 through the engine inlet 56. As the heat transfer fluid flows through the chamber 54, the heat transfer fluid is heated by warm exhaust gas flowing through the exhaust pipe 30. The heated heat transfer fluid exits the chamber 54 through the passageway 60, and flows to the valve 74. The control module 76 configures the valve 74 to direct the heated heat transfer fluid back to the engine 12 to help warm the engine 12 to a predetermined operating temperature. In the heat recovery mode of FIG. 3, the control module 76 does not activate the pump 72, and the reservoir 70 remains full, or at least partially full, of air, nitrogen, or any other suitable gas.

Once the heat transfer fluid has been sufficiently heated to a predetermined temperature by the exhaust (which will result in the engine 12 being warmed to a predetermined temperature), the control module 76 will close the valve 42 to prevent additional heat transfer fluid from flowing to the heat exchanger 50. The control module 76 will also reconfigure the valve 74 so that the heat transfer fluid no longer flows to the engine 12, but instead flows to the reservoir 70. The control module 76 also activates the pump 72 to pump the heat transfer fluid into the reservoir 70, and in doing so displace the air, nitrogen, or other gas within the reservoir 70 into the chamber 54 of the heat exchanger 50 through the reservoir inlet 58. This pump out mode of FIG. 4 advantageously prevents the heat transfer fluid from being overheated by exhaust flowing through the exhaust pipe 30, and prevents overheated heat transfer fluid from flowing to the engine 12, which may reduce performance of the engine 12 and/or undesirably affect the heat transfer fluid. Heat transfer fluid flowing through the engine 12 may be circulated through the radiator 14 to further prevent the heat transfer fluid and/or the engine 12 from becoming too warm.

Figure 6:
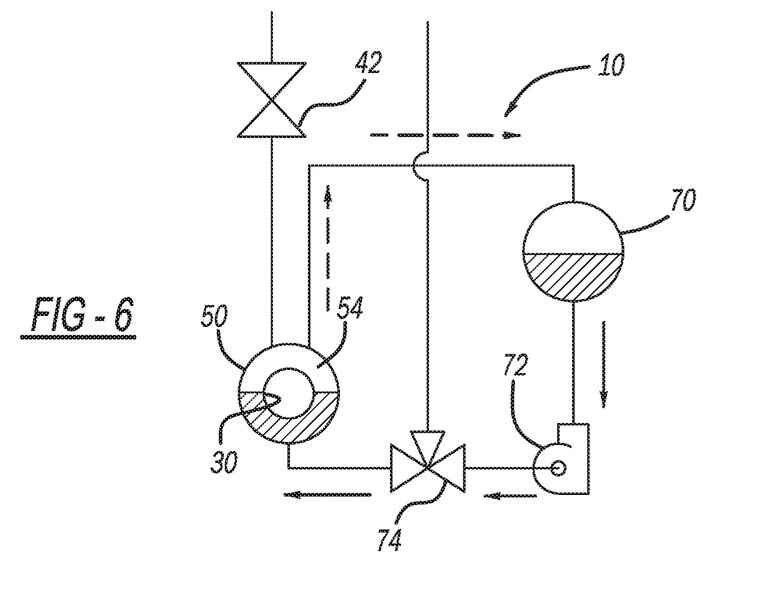
FIG. 6 illustrates the exhaust heat recovery and heat storage system of FIG. 1 in a refill mode.

After the reservoir 70 has been filled with heat transfer fluid and the heat exchanger 50 is filled with the air, nitrogen, or other suitable gas that was stored in reservoir 70, the control module 76 deactivates the pump 72 to configure the system 10 in the standby mode of FIG. 5. The valve 42 remains closed in the standby mode of FIG. 5. Once the temperature of the engine 12 falls below a predetermined temperature, such as at a cold engine start, the control module 76 configures the system 10 in a refill mode, as illustrated in FIG. 6. In the refill mode of FIG. 6, the control module 76 configures the valve 74 to allow heat transfer fluid stored in the reservoir 70 to flow through the valve 74 and into the chamber 54 of the heat exchanger 50. Because the reservoir 70 is arranged at an elevation higher than the heat exchanger 50, gravity will cause the heat transfer fluid to flow into the chamber 54 without the pump 72 having to be activated. As the heat transfer fluid flows from the reservoir 70 into the chamber 54, air within the chamber 54 is forced into the reservoir 70. Once exhaust flowing through the exhaust pipe 30 raises the temperature of the heat transfer fluid within the chamber 54 above a predetermined temperature, the control module 76 will configure the system 10 in the heat recovery mode of FIG. 3, whereby the heated heat transfer fluid is directed to the engine 12 to facilitate warmup of the engine 12.

If the reservoir 70 is well insulated, the coolant stored in the reservoir 70 during standby mode can remain hot after engine shut-down, and further accelerate engine warm-up if heat exchanger refill mode is not activated until engine cold start.

Figure 7:
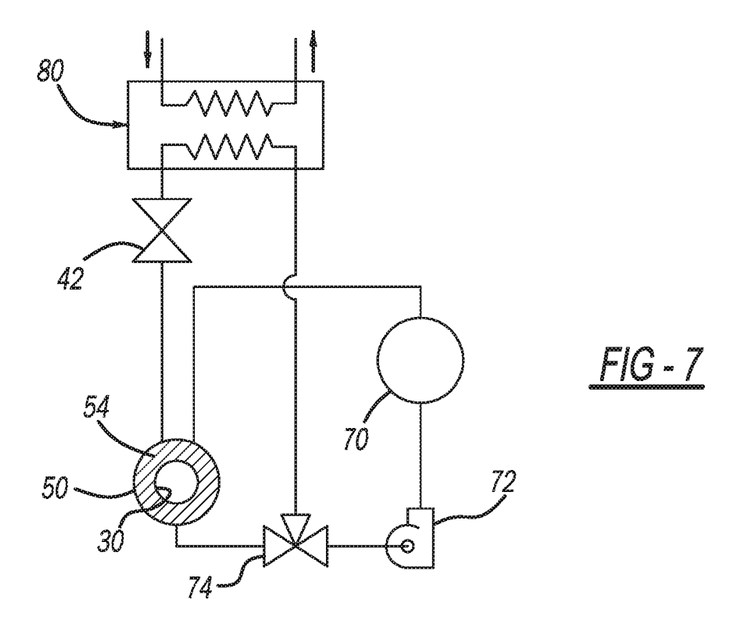
FIG. 7 illustrates the exhaust heat recovery and heat storage system of FIG. 1, and a secondary heat exchanger that transfers heat to and from the exhaust heat recovery and heat storage system of FIG. 1.

The system 10 can be directly connected to the engine 12 by way of conduits 40 as illustrated in FIG. 1. Alternatively, and with reference to FIG. 7, any suitable secondary heat exchanger 80 can be arranged between the system 10 and the engine 12. The secondary heat exchanger 80 can be any suitable heat exchanger for exchanging heat between heat transfer fluid flowing through the system 10 and heat transfer fluid flowing directly through the engine 12.

Figure 8:
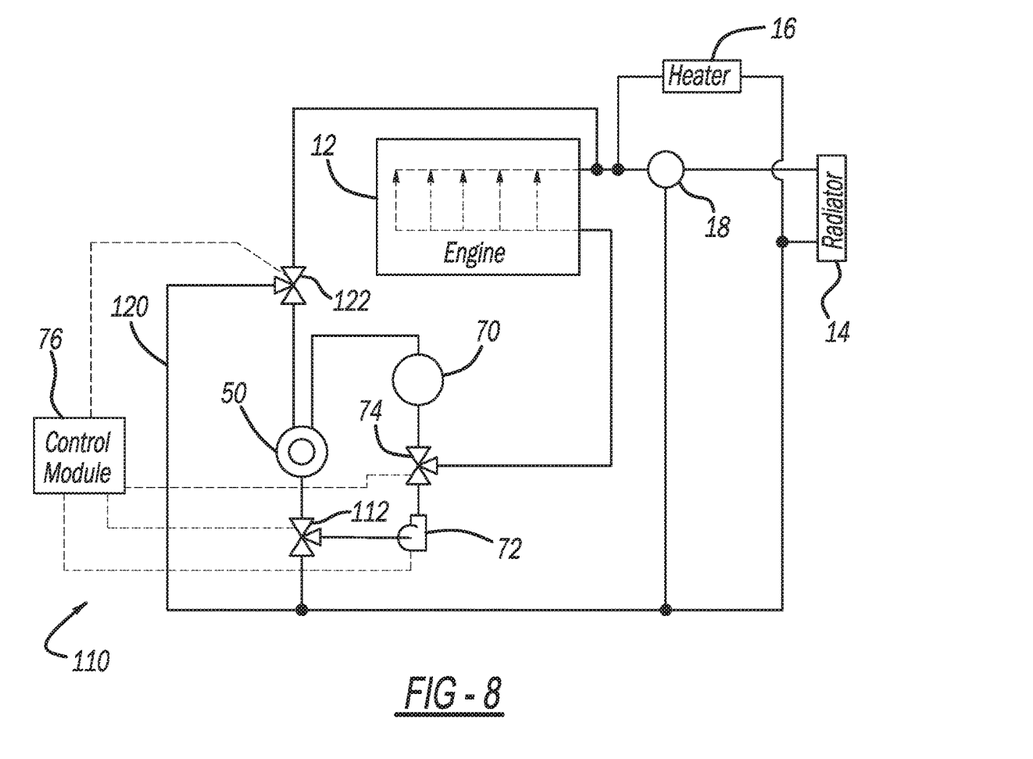
FIG. 8 illustrates another exemplary exhaust heat recovery and heat storage system according to the present teachings connected to an exemplary engine Corresponding reference numerals indicate corresponding parts throughout the several views of the drawings.

FIG. 8 illustrates another exemplary exhaust heat recovery and heat storage system in accordance with the present teachings at reference numeral 110. Unlike the configuration of FIG. 1, the configuration of FIG. 8 does not include the pump 20. Instead, the configuration of FIG. 8 includes only a single pump in the form of pump 72. The system 110 of FIG. 8 further includes a three-way valve 112 between the heat exchanger 50 and the pump 72, as well as a bypass line 120 extending around the heat exchanger 50 from another three-way valve 122 in order to direct flow of the heat transfer fluid around the heat exchanger 50.

During a cold engine start, for example, the control module 76 will activate the pump 72, configure the three-way valve 122 to allow heat transfer fluid to flow from the engine 12 through the valve 122 to the heat exchanger 50 instead of to the bypass line 120, completely open the three-way valve 112, and configure the three-way valve 74 such that heat transfer fluid pumped out of the heat exchanger 50 flows through the valve 112, across the pump 72, and through the valve 74 to the engine 12. The valve 74 is configured to block the passage of contents of the reservoir 70 through the valve 74.

In a pump out mode, the control module 76 activates the pump 72, completely closes the valve 122, configures the valve 112 such that heat transfer fluid within the heat exchanger 50 can be pumped out of the heat exchanger 50 to the valve 74, and through the valve 74 into the reservoir 70. A restrictor may be included between the valve 74 and the reservoir 70 since the pump 72 used in the single pump system of FIG. 8 will likely have a much higher flow rate than the pump 72 used in the dual pump system of FIG. 1.

During normal operation of the engine 12, the control module 76 may configure the system 110 in a standby mode. In the standby mode the control module 76 activates the pump 72 and configures the valve 122 to direct heat transfer fluid from the engine 12 to the bypass line 120, and thus block the flow of heat transfer fluid from the engine 12 through the valve 122 to the heat exchanger 50. The control module 76 configures the valve 112 to block passage of heat transfer fluid from the heat exchanger 50 through the valve 112. Instead, the valve 112 is configured to allow heat transfer fluid flowing from the bypass line 120 to pass through the valve 112 to the pump 72. The valve 74 is configured to allow the heat transfer fluid to flow from the pump 72 through the valve 74 and back to the engine 12. The valve 74 is configured to prevent contents of the reservoir 70 from flowing through the valve 74.

To refill the heat exchanger 50 with heat transfer fluid, the control module 76 deactivates the pump 72 and completely closes the valve 122. The valve 74 is configured to allow heat transfer fluid therein to flow through the valve 74 under the influence of gravity, and to the valve 112. The valve 112 is configured by the control module 76 to allow the heat transfer fluid from the reservoir 70 to flow through the valve 112 and into the heat exchanger 50 in order to refill the heat exchanger 50.

It will be recognized by one skilled in the art that the function provided by each three-way valve described in the above systems could also be accomplished by utilizing two or three two-way valves.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An exhaust heat recovery system comprising:
   a heat exchanger configured to transfer heat from engine exhaust to a heat transfer fluid;
   a reservoir in fluid communication with the heat exchanger; and
   a pump configured to pump the heat transfer fluid out of the heat exchanger and into the reservoir, and in doing so displace air out of the reservoir to the heat exchanger, when temperature of the heat transfer fluid exceeds a predetermined temperature;
   wherein the heat exchanger includes an outer chamber arranged outside a flow path of the engine exhaust, the outer chamber having: a first inlet for heat transfer fluid flowing from the engine; a second inlet separate from the first inlet for heat transfer fluid or air flowing from the reservoir; and an outlet separate from the first inlet and the second inlet for heat transfer fluid and air.

2. The system of claim 1, wherein the heat exchanger defines a single through bore for accommodating exhaust.

3. The system of claim 1, wherein the reservoir is arranged above the heat exchanger such that gravity draws heat transfer fluid within the reservoir to flow to the heat exchanger.

4. The system of claim 1, further comprising at least one valve selectively providing fluid communication between the heat exchanger, the reservoir, and the engine.

5. The system of claim 4, wherein the pump is between the at least one valve and the reservoir along a fluid line extending therebetween.

6. The system of claim 1, wherein the pump is an electric pump.

7. The system of claim 1, further comprising a two-way valve between the heat exchanger and the engine along a fluid line extending therebetween.

8. The system of claim 1, wherein the pump is the only pump of a combined exhaust heat recovery system and engine cooling system.

9. The system of claim 1, further comprising a bypass fluid line directing heat transfer fluid or air around the heat exchanger so that the heat transfer fluid or air does not flow through the heat exchanger.

10. The system of claim 1, wherein at least one valve is configured to direct heat transfer fluid from the heat exchanger to the engine, and not to the reservoir, in a heat recovery mode.

11. The system of claim 1, wherein the pump pumps heat transfer fluid from the heat exchanger through at least one valve to the reservoir and in doing so displaces air from the reservoir into the heat exchanger in a pump out mode; and
   wherein the at least one valve is configured to block flow of heat transfer fluid through the at least one valve to the engine in the pump out mode.

12. The system of claim 1, wherein the heat exchanger is a first heat exchanger, the system further comprising a second heat exchanger that exchanges heat between first heat transfer fluid flowing through the exhaust heat recovery system and second heat transfer fluid that flows directly through an engine producing the engine exhaust; and
   wherein the first heat transfer fluid is the same as, or different than, the second heat transfer fluid.

13. The system of claim 1, wherein at least one valve allows heat transfer fluid to flow under the influence of gravity backwards through the pump from the reservoir into the heat exchanger, and in doing so displaces air out of the heat exchanger and into the reservoir in a refill mode; and
   wherein the at least one valve is configured to block flow of heat transfer fluid through the at least one valve to the engine in the refill mode.

* * * * *